Dec. 2, 1958  R. T. BURNETT  2,862,580
BRAKE ASSEMBLY

Filed Dec. 7, 1953  2 Sheets-Sheet 1

INVENTOR.
RICHARD T. BURNETT
BY Cecil J. Arenz

ATTORNEY

Dec. 2, 1958   R. T. BURNETT   2,862,580
BRAKE ASSEMBLY
Filed Dec. 7, 1953   2 Sheets-Sheet 2

INVENTOR.
RICHARD T. BURNETT
BY Cecil E Arens

ATTORNEY

United States Patent Office 2,862,580
Patented Dec. 2, 1958

2,862,580
BRAKE ASSEMBLY

Richard T. Burnett, South Bend, Ind., assignor to Bendix Aviation Corporation, South Bend, Ind., a corporation of Delaware Application December 7, 1953, Serial No. 396,470

8 Claims. (Cl. 188—73)

This invention concerns brakes, and more particularly it relates to an improvement in the construction thereof.

In certain types of brakes such, for example, as the one disclosed in my application Serial No. 369,197, filed July 20, 1953, it is standard practice to attach the wear pad or lining material directly to the pistons for frictional contact with the rotatable element or disks. This practice has the disadvantages of (a) necessitating complete replacement of a fluid motor or of at least the pistons when the lining is worn out which in many cases results in the loss of hydraulic fluid from the system and the consequent requirement for refilling and rebleeding and (b) requiring that the axis of the cylinder be maintained perpendicularly to the engaging surface of the disk to provide uniform wear of the lining.

It is therefore a primary object of this invention to overcome the above mentioned disadvantages which are frequently encountered with disk type brakes.

An important object of the invention resides in the provision of means capable of aligning the wear pad of a brake with respect to the engaging surface of the rotatable element to produce uniform wear of the pad throughout its life.

Another object of the invention resides in the provision of means for minimizing the heat transfer to the wheel cylinder of a brake.

A further object of the invention is to provide a connection between the wear pad and piston of a disk brake to effect alignment of the pad with the engaging surface of the disk irrespective of misalignment of the piston axis from a perpendicular to the engaging surface of the disk.

A still further object of the invention lies in the provision of a wear pad for a disk brake wherein the area of the pad in contact with the engaging surface of the disk is substantially greater than the area of the end of the piston to which the pad is connected.

A yet further object resides in the provision of a wear pad having its wear surface unequally distributed about the piston axis in order to distribute the wear surface equally about the point through which the center of pressure between the drum and wear pad acts.

The above and other objects and features of the invention will be apparent from the following description of the brake assembly taken in connection with the accompanying drawings which form a part of this specification and in which.

Figure 1:
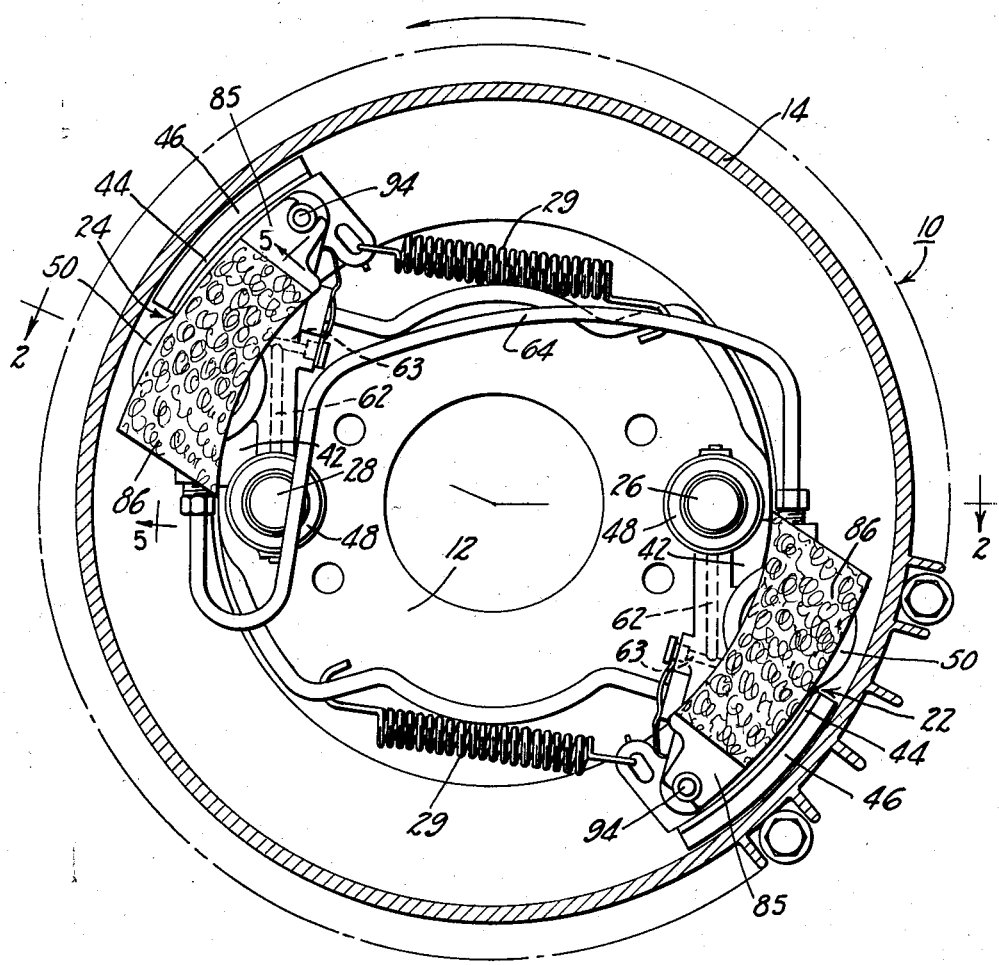
Figure 1 is a view in vertical section of a brake incorporating the device of the invention.

Referring now to the drawings and specifically to Figure 1 thereof, the reference numeral 10 designates one type of brake with which the device of the invention is associated. The brake comprises a fixed member or backing plate 12, a rotatable element 14 having spaced parallel sides 16 and 18 and a cylindrical portion 20 joining the sides together. Braking devices 22 and 24 are pivotally supported on anchors 26 and 28, respectively, which are suitably secured to the backing plate 12. Springs 29 interconnected between the backing plate and the braking devices hold the latter out of engagement with the surface of the cylindrical portion when the brake is released.

The anchors 26 and 28 which are identical, only one of which will be described in detail, perform the function of a hydraulic connection for the braking devices. With reference to anchor 26 it is provided with a longitudinal bore 30 and radial passages 32 intersecting the bore. The radial passages 32 terminate in an annular channel 34 formed in cylindrical surface 36 of the anchor 26. The end of the bore 30 opposite from its intersection with radial passages 32 is enlarged and threaded at 38 to be connected to a hydraulic line, not shown. Anchor 28 is equipped with a fitting 41 adapted to bleed the system.

The braking devices 22 and 24 are identical and each is constructed with a web element 42 and a shoe element 44, the latter having lining material 46 secured thereto for frictional engagement with the surface of the cylindrical portion 20 of the rotatable element 14. Cylindrical members 48 and 50 are formed integral with the web element 42. The cylindrical member 48 is of such an internal diameter as to rotatably cooperate with the cylindrical surface 36 of the respective anchor. Seals 52 are located on each side of the annular channel 34 and wipe the internal surface of the cylindrical member 48 which is laterally held between a shoulder 54 of the anchor and a washer 56. A retaining ring 58 is carried in a groove 60 of the anchor to lock the washer 56 in position against one end of the cylindrical member 48. Passages 62 and 63 communicate the annular channel 34 with the cylindrical member 50. A conduit 64 connects the cylindrical members 50 of the two braking devices.

Figure 4:
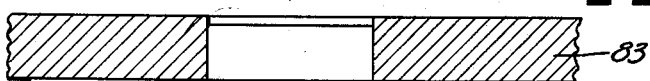
Figure 4:
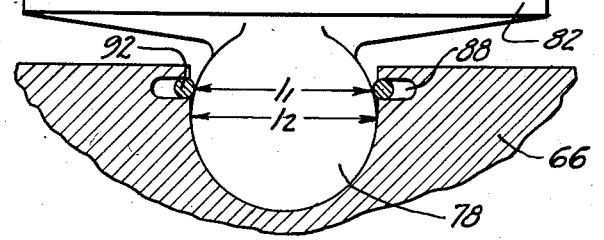

A pair of oppositely acting pistons 66 and 68 are housed in the cylindrical member 50. The adjacent ends of the pistons, which are subjected to fluid under pressure, are chamfered to provide a chamber 70 when the pistons are retracted. This chamber communicates with the passage 63. Seals 71 encircle the pistons 66 and 68 and prevent leakage of fluid from the chamber 70. Guide pins 72 extend into the two pistons in order to hold them in coaxial relationship throughout their movement. (The novel arrangement of the cylinder and pistons is the subject matter of my copending application Serial No. 428,742 filed May 10, 1954.) The remote ends of the pistons 66 and 68 are formed with sockets 74 and 76, respectively, for the reception of spherical elements 78 and 80 integrally related to flat circular portions 82 and 84 which are mounted to plates 83 and 85 to which wear pads or friction material lining 86 is secured. The sockets 74 and 76 are provided with circumferential grooves 88 and 90 into which C-shaped spring elements 92 are inserted to lock the spherical elements or balls in their respective sockets. As best shown in Figure 4 the inner diameter $I_1$ of the C-shaped element when retracted is less than the diameter $I_2$ of the ball so that the element must actually expand into the groove 88 to allow withdrawal of the ball 78 from its socket. The depth of groove 88 must be such as to allow the C-shaped element to expand until $I_1$ equals $I_2$. The ball 78 is therefore releasably locked into the socket by the yieldable element. To prevent rotation of the wear pads 86 about the axes of the pistons the plates 83 and 85 are slotted at their ends for engagement with pins 94 carried perpendicularly to the web elements 42.

Figure 5:
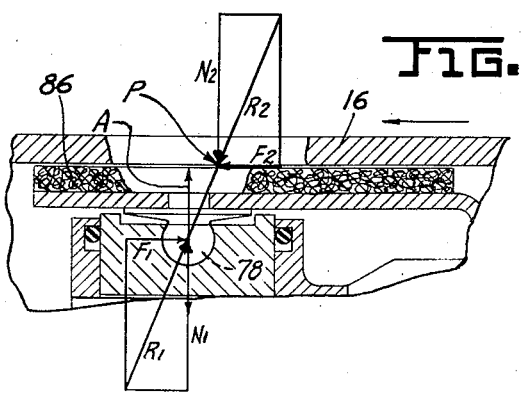
Figure 5 is a force diagram of the center of pressure superimposed on a sectional view of the device taken on line 5—5 of Figure 1, some of the cross hatching being omitted.
Figure 2:
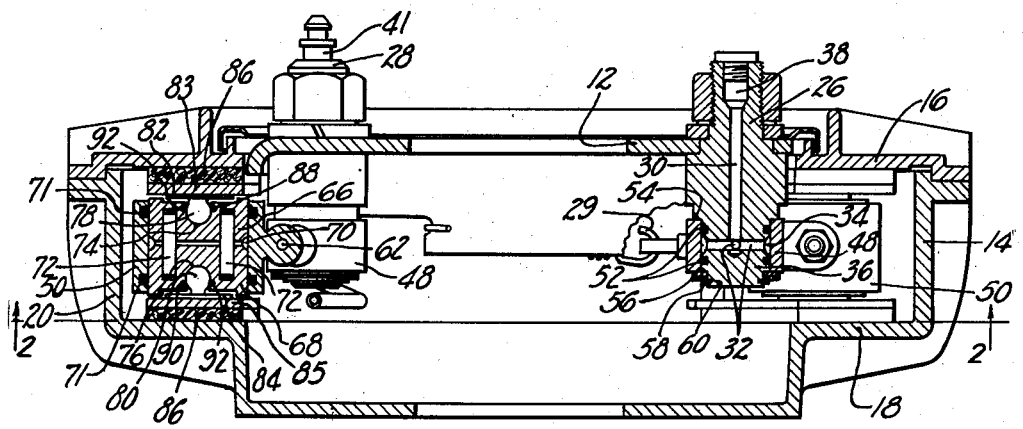
Figure 2 is a view in section taken on the line 2—2 of Figure 1.
Figure 4A:
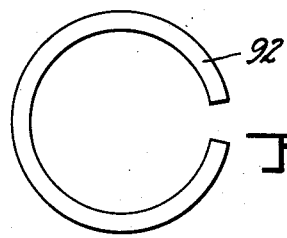
Figures 4 and 4a are enlarged views of the ball and socket joint connection and the locking element respectively.

With reference to Figure 5, the forces acting on the disc friction pad are shown superimposed on the brake device. The point P represents the geometrical center of the lining 86. $N_1$ is the force acting along the axis of the piston as a result of liquid pressure thereof. $N_2$ is an equal and opposite, although not collinear, force between the rotatable element and the disc friction pad. Due to rotation of the element 14, a frictional force $F_2$ is set up between the side of the rotatable element and the pad. This force is opposed by a force $F_1$ passing through the spherical element 78. $R_1$ is the resultant of $N_1$ and $F_1$ and is equal, opposite, and collinear with $R_2$ which is the resultant of $N_2$ and $F_2$. The force $F_2$ with a moment arm A tends to tilt the wear pad in a counterclockwise direction in its socket. In order to equalize the tilting moment $AF_2$, and thereby promote uniform lining wear, the linear distance that P must be offset from the applying force $N_1$ is determined by taking moments about the central point of application, viz, the center of the spherical element 78. The magnitude of force $N_2$ is known, being equal to $N_1$, the applying force, and $F_2$ is equal to $N_2 \times$ the coefficient of friction. Thus, the offset distance is equal to $$A \frac{F_2}{N_2}$$

or $A \times$ the coefficient of friction. With the geometrical center P of the lining offset this distance circumferentially from the center of application of the applying effort, the wear pad is in equilibrium insofar as any tendency to rotate about the ball socket; this is further evident from the fact that resultant forces $R_1$ and $R_2$ are equal, opposite and collinear. Therefore instead of the center of pressure between the wear pad and drum being along the axis of the piston as would be the case if the moment arm A were zero, it is offset therefrom in a direction opposite to the direction of rotation of the drum as indicated by the force $N_2$ which represents the resultant normal force at the center of pressure. If this center of pressure were not the geometrical center of the plane surface of the wear pad the unit pressure over the entire surface would be nonuniform this causing uneven wear of the pad. However, by locating the wear pad so that the center of pressure acts through the geometrical center of the plane surface, uniform wear is assured since the unit pressure will be the same.

To apply the brake, pressure is developed in cylinder 50 which spreads apart pistons 66 and 68 thus bringing friction material lining 86 into forcible engagement with sides 16 and 18 of the rotatable element 14. Assuming rotation of the rotatable element 14 in a counterclockwise direction (forward direction), engagement of the friction lining 86 develops a turning force on each of the braking devices 22 and 24 so that they pivot on their respective anchors 26 and 28. This pivoting movement of the unit about its respective anchor in a counterclockwise direction moves the arcuate friction material lining 46 in a radially outward direction and into engagement with the cylindrical portion 20. Thus, there is brought about as a result of engagement of lining 86 with the parallel sides 16 and 18, a turning force on the respective unit which is utilized as the applying effort on the arcuate or "shoe" element of the unit with the net result that there is both "disc" and "shoe" braking with the former serving as the source of applying effort on the latter.

Figure 3:
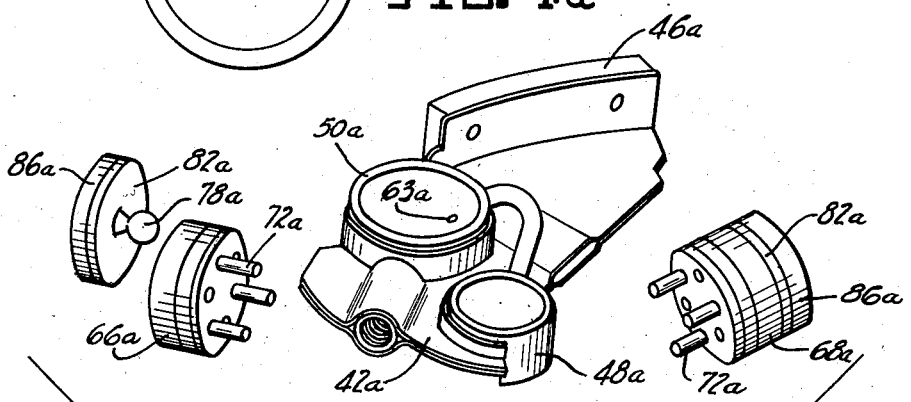
Figure 3 is a modified form of the device of the invention shown disassembled.

In the modified form shown in Figure 3, parts corresponding to those already described in connection with the embodiment of Figure 1 are given the same reference numeral with the subscript $a$ affixed thereto. The braking device of Figure 3 is similar in construction to the preferred embodiment except that wear pads 86a are disk like elements securely mounted to plates 82a and 84a with which spherical portions are integrally related as in the previous embodiment.

The arrangement of the ball and socket joints between the pistons and wear pads ensures alignment between the wear pads and the surfaces they contact, thus providing a maximum amount of contact area between the pads and the parallel sides. That is, the pistons need not have their axes perpendicular to the parallel sides, yet the wear pads will adjust themselves so that the entire area of the wear pads will contact the surface of the sides. This also ensures uniform wear of the wear pads. Another advantage of this arrangement is the simplicity of replacing a wear pad without removing the pistons from the braking devices. This represents a substantial saving in cost of replacement.

Tests show that the ball joint connection between the piston and wear pad is conducive to a decrease in heat transfer by conduction between these parts.

Although this invention has been described in connection with certain specific embodiments, the principles are susceptible of numerous other applications that will readily occur to persons skilled in the art.

I claim:

1. In a brake, a rotatable element having spaced parallel sides and a cylindrical portion joining said sides, a fixed supporting structure, a braking device pivotally mounted on said structure for frictional contact with said cylindrical portion and comprising a fluid actuated motor equipped with oppositely acting pistons having their remote ends facing said sides respectively, wear pads carried by the remote ends of said pistons for frictional contact with said sides to cause said device to pivot, and ball and socket connections between said pistons and pads.

2. In a brake, a rotatable element, a braking device for said element comprising a fluid motor provided with a piston actuable for effecting braking of said element, a wear pad interposed between said piston and said element, a ball and socket joint connection between said pad and piston, a groove in the socket toward its open end, and a spring element in the groove extending a substantial distance therearound with the outer portion of the element lying in the groove and the inner portion of the element lying adjacent the ball.

3. In a brake, a rotatable element, a braking device for said element comprising a fluid motor provided with a piston actuable for effecting braking of said element, a wear pad interposed between said piston and said rotatable element, said wear pad being actuated by said piston and so positioned relative to the piston that the point in the surface of the wear pad through which the resultant of the pressure of the piston and the friction between said pad and said rotatable element acts lies in the geometrical center of the wear pad surface, and means connecting said piston to said pad which enables uniformly pressurized contact between the engageable surfaces of said pad and said rotatable element.

4. In a kinetic energy absorbing apparatus, a pair of oppositely acting flat friction elements, a rotatable member having two laterally spaced-apart sides, an actuating device associated with each of said elements, and means interconnecting each of said actuating devices and the associated friction elements, said means providing for swivelling of said friction elements which enables completely conformable contact between said friction elements and the engageable surface of the rotatable member, said means being offset in the direction of forward rotation of the rotatable member a sufficient distance from the geometrical center of the friction element so that the applying thrust exerted on the friction element produces a tilting moment thereon substantially equal to the tilting moment developed from engagement of the friction element with the associated rotor side.

5. In a kinetic energy absorbing device, a friction member movable into contact with a relatively rotatable member, a force generating means for developing applying force on said friction member, and an operative connection between said force generating means and friction member which is offset a sufficient distance from the geometrical center of said friction member so that the resulting moment of the normal force acting at said geometrical center substantially equalizes the tangential turning force developed from engagement of the friction member with the relatively rotatable member.

6. In a brake, a rotatable element, a fixed supporting structure, a braking device mounted on said structure, said device comprising a fluid actuated motor equipped with a piston, a wear pad interposed between the end of said piston and the rotatable element and actuatable by said piston into frictional engagement with said rotatable element, said wear pad having an area in contact with the engaging surface of the rotatable element substantially greater than the area of the end of the piston, said wear pad also having its wear surface unequally distributed about the piston axis in such a way as to distribute the wear surface equally about the point at which the center of pressure between the rotatable element and wear pad acts, and means holding said pad from substantial movement relative to said piston in a plane perpendicular to the axis of said rotatable element.

7. In a brake, a rotatable element having spaced parallel sides, a fixed support member, a braking device for said rotatable element mounted on said support member and comprising a fluid cylinder with its operative end located adjacent one of said sides, a piston in the operative end of said cylinder, and a wear pad operatively combined with said piston in a manner facilitating detachability therefrom and movable into engagement with one of the sides of said rotatable element, the geometrical center of said wear pad being offset with respect to the center of application of the applying force so that the greater portion of the engaging surface of the wear pad is on the side of said applying force opposite to the direction of forward rotation of said rotatable element, the amount of said offset being such that the resultant force acting between the wear pad and rotatable element passes through a point substantially equidistant circumferentially from the ends of said wear pad, said resultant being equal and opposite to and collinear with the resultant of the applying force exerted by the piston on said wear pad and the force which opposes the frictional force created upon engagement of the wear pad with the rotatable element.

8. In a brake, a rotatable element, a braking device for said element comprising a fluid motor provided with a piston actuable for effecting braking of said element, a wear pad operatively combined with the outer end of said piston with the engaging surface of the wear pad at a substantially right angle to the axis of said piston, the greater part of the engaging surface of said wear pad being on the side of said piston axis opposite to the direction of forward rotation of said element, and a concave-convex rockable connection between said pivot pad.

References Cited in the file of this patent

UNITED STATES PATENTS

| | | |
|---|---|---|
| 1,877,430 | Skopik | Sept. 13, 1932 |
| 2,245,987 | Lambert | June 17, 1941 |
| 2,256,725 | Pierce et al. | Sept. 23, 1941 |
| 2,352,829 | Forbes | July 4, 1944 |
| 2,386,477 | Kraft | Oct. 9, 1945 |
| 2,478,333 | Sneed | Aug. 9, 1949 |
| 2,485,086 | Cagle | Oct. 18, 1949 |
| 2,657,772 | Chamberlain | Nov. 3, 1953 |
| 2,679,303 | Wright et al. | May 25, 1954 |

FOREIGN PATENTS

| | | |
|---|---|---|
| 707,074 | Germany | June 12, 1941 |